Jan. 9, 1923. 1,441,530
R. SALIN, neé LEVY.
FASTENING DEVICE FOR DOORS OF MOTOR VEHICLES.
FILED MAR. 4, 1921. 3 SHEETS-SHEET 1

Inventor.
Rachel Salin, neé Levy
By
atty.

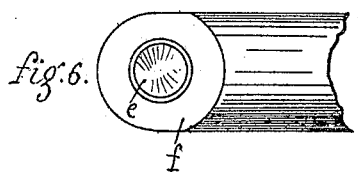
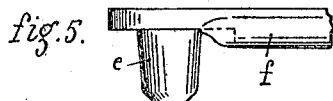
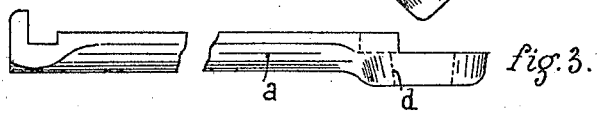
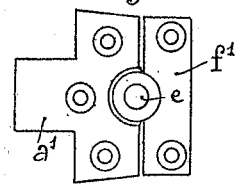
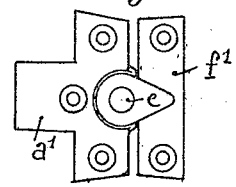
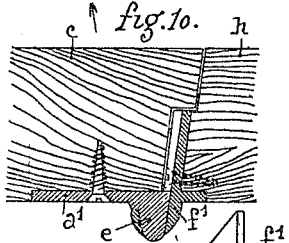
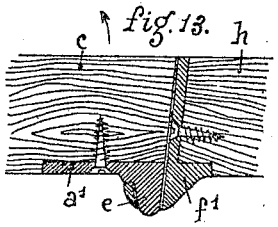
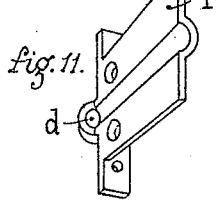

Jan. 9, 1923. 1,441,530
R. SALIN, neé LEVY.
FASTENING DEVICE FOR DOORS OF MOTOR VEHICLES.
FILED MAR. 4, 1921. 3 SHEETS-SHEET 3
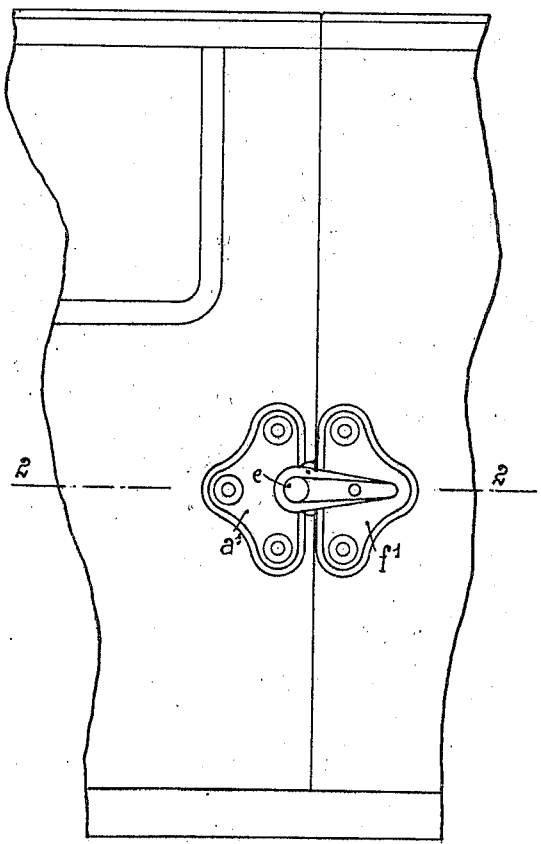
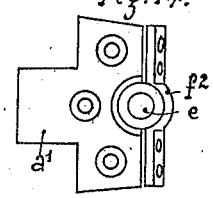
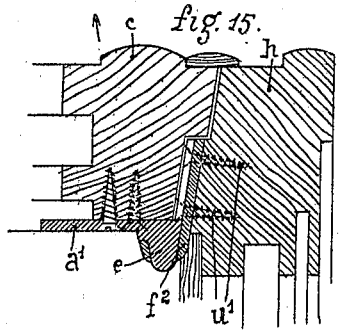
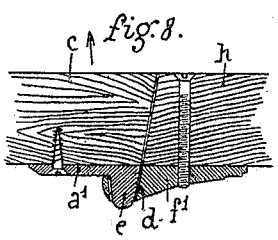
Inventor
Rachel Salin neé Levy
By Henry Orth Jr
Atty.

Patented Jan. 9, 1923.

1,441,530

UNITED STATES PATENT OFFICE.

RACHEL SALIN, NÉE LEVÝ, OF PARIS, FRANCE.

FASTENING DEVICE FOR DOORS OF MOTOR VEHICLES.

Application filed March 4, 1921. Serial No. 449,600.

*To all whom it may concern:*

Be it known that I, RACHEL SALIN, born LEVÝ, a citizen of the Republic of France, residing in Paris, France, have invented certain new and useful Improvements in Fastening Devices for Doors of Motor Vehicles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It is a recognized fact that the doors of motor vehicle bodies soon become subject to loose fitting or rattling by reason of the jarring movements of the vehicle, thereby giving rise to a very disagreeable noise and even causing the door to become open when on the road. My invention has for its object a very simple fastening device whereby all rattling of the doors of motor vehicle bodies of the open or closed type, or like doors, shall be obviated.

This device requires no modifications of existing devices and employs no members in the shape of door-bolts or springs, and is consequently not subject to wear. It comprises in principle two fittings whereof one is secured to the stationary portion of the vehicle body and the other is secured to the door, these two fittings cooperating in an automatic manner upon closing the door, a conical stud and aperture co-acting for the purpose of securing the door to the vehicle body, whereby the door is no longer subject to rattling under the effect of the jarring movements of the vehicle, even of the most violent character.

According to an improved embodiment of my invention, the two fittings constitute a co-acting device with stud and aperture, and are disposed, within the vehicle body, that is, upon the inner side of the door. The said fittings may be given any suitable length and are secured by any appropriate means, for instance they may be simply screwed or bolted to the vehicle body framing of the door and the main body.

Figure 1:
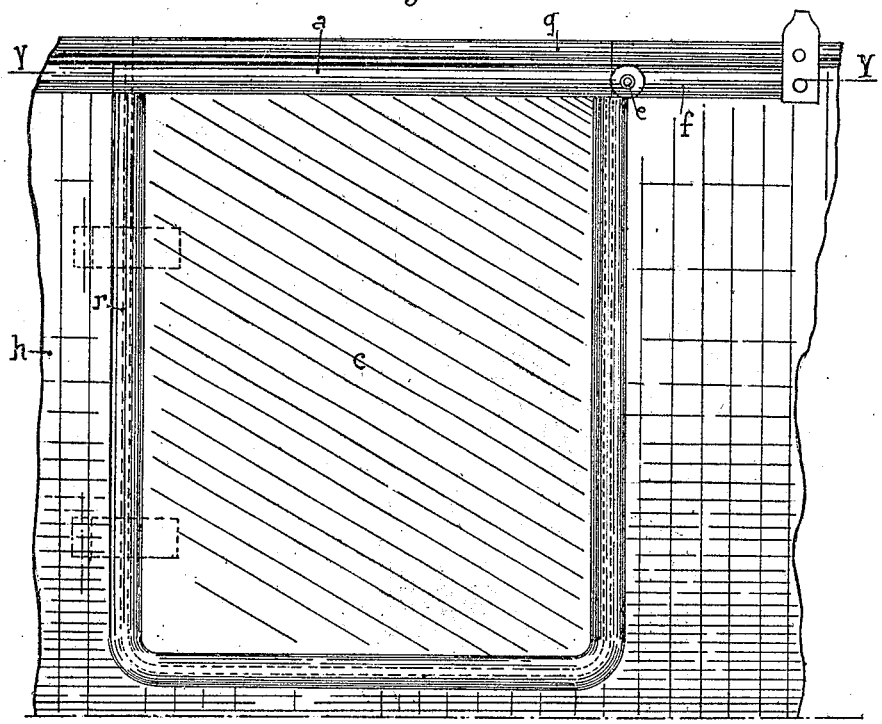
Figure 2:
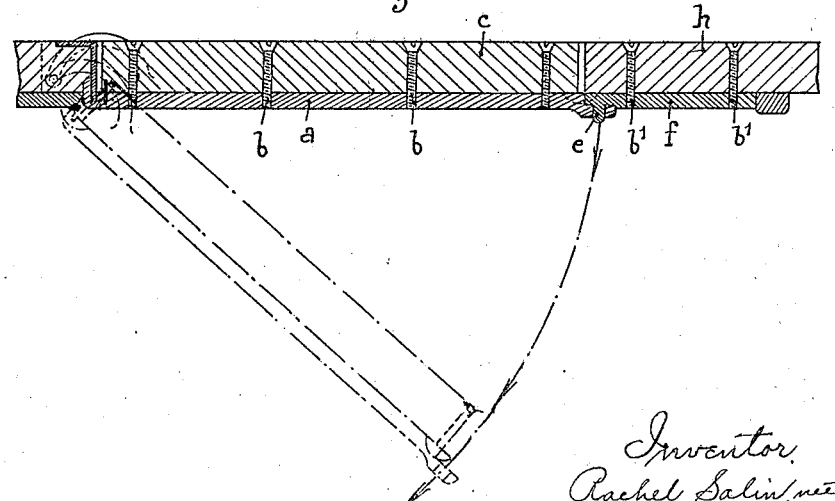

The following description together with the accompanying drawings which are given by way of example shows various embodiments of my invention, wherein:

Figure 1 is a front view showing the fastening device according to the invention as applicable to an open vehicle body of the torpedo type. Fig. 2 is a horizontal section on the line Y—Y Fig. 1. Figs. 3 and 4 are detail side and top views of the fitting adapted to be secured to the door. Figs. 5 and 6 are detail side and bottom views of the end of the fitting which is secured to the vehicle body. Fig. 7 is a view, from the inner side, of a door provided with the improved fastening device. Fig. 8 is a horizontal section on the line 2—2. Figs. 9 and 10 are views corresponding to Figs. 7 and 8 which is a modified form of construction. Fig. 11 is a detail perspective view of the apertured member as shown in Figs. 9 and 10. Figs. 12 and 13 are views corresponding to Figs. 7 and 8 of another form of construction of the fastening device. Figs. 14 and 15 represent a third modified form of the said device as employed for a front door of a coupé or closed vehicle.

The fastening device according to my invention comprises a fitting $a$ secured for instance by means of screws $b$ along the door $c$ and extending throughout the entire width thereof. The end of the said fitting is provided with an aperture $d$ (Figs. 3 and 4) cooperating with a stud $e$ formed at the end of the second fitting $f$ of the fastening device (Figs. 5 and 6), the fitting $f$ being secured by the screws $b^1$ to the fixed frame $h$ of the vehicle body.

As will be observed, the fastening device thus comprises two fittings the ends thereof are adapted to cooperate in an automatic manner by the simple closing of the door. When the door is closed, the two fittings $a$ and $f$ are connected together by reason of the cooperation of the stud $e$ and the aperture $d$, and in this manner the door $c$ is secured in such manner as to practically form part of the vehicle body and the door is altogether prevented from the rattling under the effect of the jarring movements of the vehicle.

It is found advantageous to dispose, as shown in the drawings, the fixtures $a$ and $f$ below the moldings $g$ which are generally raised above the surface, whereby the said fittings shall be made invisible to the greatest possible extent. In that case it is evidently necessary to cut out the upper end of the vertical moldings $r$ for the purpose of securing the fittings $a$, $f$. The said fittings could likewise be substituted for the molding $g$.

According to an improved constructional form of my invention, the two fittings $a^1$ and $f^1$ whereof the first ends in a stud $e$ and the second in an aperture $d$, are secured to the inner side of the vehicle body as shown in Fig. 7 and in the sectional view Fig. 8. These fittings $a^1$ $f^1$ may be given any suitable length, and they are simply screwed to the fixed and movable framing of the door. They may likewise be cut out as shown in the said figures. It is found advantageous to give to the fitting $f^1$ the shape of an angle bar as shown in section in Figs. 10 or 13, in such manner as to enable it to be secured by screws as shown at $u$ against the framing $h$ of the vehicle body, inasmuch as it is this fitting $f^1$ which upon closing the door is called upon to support the efforts tending to pull it way from the framing $h$. As observed, the fitting $f^1$ may be made flat as shown in Fig. 13 or may be provided with a groove cooperating with the stud $e$, Fig. 11.

In the case of the front door of a coupé, the fitting may be advantageously mounted as shown in Figs. 14 and 15. The fitting $f^2$ is secured by the screws $u^1$ upon the door post or framing of the vehicle body and has no right-angled portion.

It is obvious that the said fittings may be given any other suitable shape and may be secured in any other appropriate manner, these fittings being preferably disposed upon the inner side of the door and of the carriage body framing. It is of course understood that my invention is not limited to the above-described embodiments thereof, and is susceptible of all necessary modifications which may be made without departing from the principles of the invention, and especially in the fact that the fittings may be manufactured of various metals and in all suitable cross-sections, and the said fittings may be secured by any suitable means such as wood screws, machine screws, and the like.

The present fastening device according to my invention is not limited in its application to the doors of motor vehicles, but is likewise applicable to all doors which are subject to jarring movements and mounted upon vehicles of any kind, for instance upon railroad cars. The cooperating means comprising stud and aperture may be modified as desired and may comprise any suitable male portion co-acting with a female portion.

I claim:

1. A fastening device for motor vehicle doors, comprising a metallic member fitting along the face of the door and a metallic member fitting along the face of the door frame, or body, a metallic conical stud on one of the members and the other metallic member having a conical aperture provided in the metal automatically engaged by said stud when the door is closed, and surrounding exactly the conical stud upon the entire periphery thereof.

2. A fastening device for motor vehicle doors, comprising a metallic member fitting along the face of the door, a second metallic member fitting along the face of the door frame, or body, both members being substantially in longitudinal alinement, one of said members having a metallic stud having the form of a cone whose axis is perpendicular to the length of the vehicle and the other member having a conical aperture provided in the metal in order to receive the cone and surrounding it exactly upon its entire periphery upon closing the door whereby all rattling of the door is obviated.

3. A fastening device for motor vehicle doors, comprising a member to be fixed to the internal face of the door, a metallic stud having the form of a cone whose axis is perpendicular to the face of the door, a metallic member to be secured to the internal face of the door frame and having an aperture in the form of a cone to receive said stud by surrounding the same upon the entire periphery when the door is closed.

In testimony that I claim the foregoing as my invention, I have signed my name.

RACHEL SALIN née LEVY.